UNITED STATES PATENT OFFICE.

JAMES L. HASTINGS, OF PHILADELPHIA, PENNSYLVANIA, ASSIGNOR TO THE WELSBACH INCANDESCENT GAS LIGHT COMPANY, OF NEW JERSEY.

PLASTIC MINERAL COMPOSITION.

SPECIFICATION forming part of Letters Patent No. 400,336, dated March 26, 1889.

Application filed September 27, 1888. Serial No. 286,583. (No specimens.)

*To all whom it may concern:*

Be it known that I, JAMES L. HASTINGS, a citizen of the United States, residing at Philadelphia, in the county of Philadelphia and State of Pennsylvania, have invented new and useful Improvements in Plastic Mineral Compositions, of which the following is a specification.

This invention relates to new plastic mineral compositions and vitreous or crystalline compounds for use in chemical and other arts, and for incandescent illumination by means of a gas-flame or other source of heat, said composition being adapted for molding into articles of various forms, and for coating metallic and other articles to protect them from the oxidizing and corroding influence of air, moisture, acids, &c., and from injury by heat. The plastic compound, when properly burned or fired, is highly refractory, very hard, crystalline in structure, rough on the surface, white or opalescent, and practically infusible.

The object of the invention is to produce a readily incandescing compound capable of resisting the action of intense heat, and particularly adapted for forming incandescent burners, or attachments for burners, for illumination with coal-gas, water-gas, or natural gas or other source of heat.

The plastic compound is formed of ingredients mixed in about the proportions set forth in the following formulas:

No. 32.

| | Grains. |
|---|---|
| Strontium oxide (caustic) | 30 |
| Strontium carbonate (C. F.) | 20 |
| Strontium carbonate (native rock) | 40 |
| Strontium sulphate (native rock) | 40 |
| Calcium oxide | 20 |
| Calcium carbonate (C. P.) | 20 |
| Magnesium oxide | 20 |
| Magnesium carbonate | 20 |
| Calcium fluoride | 100 |
| Magnesium chloride | 100 |
| | 410 |

After reducing to a fine powder and thoroughly mixing the ingredients, I subject the batch to the searching heat of a blast or wind furnace in a platinum crucible, and after the volatile matter is driven off it fuses to a white mass, which upon cooling becomes very hard and has a metallic ring when it is struck with a hammer. I break up this material and repulverize it to an impalpable powder and then make use of it in the following formula for an incandescing material. I take of this material (which I have named "No. 32") one hundred and twenty grains.

| | Grains. |
|---|---|
| No. 32 | 120 |
| Magnesium oxide | 400 |
| Magnesium sulphite | 25 |
| Calcium sulphite | 20 |
| Calcium sulpho-carbolate | 30 |
| Flux-calcium fluoride | 95 |
| Uranium oxide | 4 |
| Starch | 100 |
| | 794 |

These ingredients are thoroughly mixed after having been pulverized to an impalpable powder, and then are prepared for molding into tubes or other forms by being mixed with gum-tragacanth or bassorine, which has been steeped in water, or acidulated water. In mixing these ingredients I first pulverize the calcium fluoride thoroughly, then add the pulverized material from the compound first above stated, which, for the sake of convenience, I have named "No. 32." I then add the starch and stir thoroughly into the fluor-spar and the No. 32," for the purpose of supporting or floating these materials, which are very heavy, (and hard to make combine with magnesium oxide when mixed dry,) in order that they may combine uniformly with the magnesium oxide and other ingredients which are added in the order named in the formula. This makes a very durable nice material when fired, and yields good light under the influence of a suitable heat. The four grains of uranium oxide are sufficient to color the light of compound produced by this formula to the proper shade.

I do not confine myself to the above-stated formula or proportions—as, for instance, instead of No. 32 I have used the following formula, called "No. 40."

No. 40.

|  | Grains. |
|---|---|
| Strontium oxide (caustic) | 30 |
| Strontium carbonate (native rock) | 45 |
| Strontium sulphate (native rock) | 45 |
| Calcium oxide | 50 |
| Calcium carbonate | 30 |
| Calcium fluoride | 100 |
| Magnesium chloride | 100 |
|  | 400 |

This batch is prepared and melted down in the same manner as No. 32, and I have used it to good effect in the following formula:

|  | Grains. |
|---|---|
| No. 40 | 75 |
| Magnesium oxide | 300 |
| Magnesium sulphate | 20 |
| Calcium fluoride | 60 |
| Uranium oxide | 3 |
| Starch | 50 |
|  | 508 |

This makes a good material for yielding light upon the application of heat.

I have also used the following to good effect:

|  | Grains. |
|---|---|
| No. 32 | 50 |
| No. 40 | 50 |
| Magnesium oxide | 350 |
| Calcium fluoride | 70 |
| Uranium oxide | 3 |
| Starch | 75 |
|  | 598 |

This yields a good light by incandescence, and is a good material.

It is evident that these formulas can be varied in many particulars and yet make a material that will give good results as an incandescing material. The formulas No. 32 and No. 40 will not yield light by incandescence by themselves, but when united with the other metallic compounds a good and solid material is formed which is readily incandescing and gives a good light.

All formulas being prepared for molding, the finished materials are prepared in the gum that I have heretofore stated.

The plastic composition is molded into slender rods or pencils, and into tubes or other desired forms, and may be coated upon articles of metal or other material, and in such form is subjected to a low drying temperature, to drive off the moisture or more volatile matter, and then to a high temperature in a gas or other furnace, and may afterward be suspended in a gas-flame for completing the process of burning and for testing and proving the finished article.

The proportions of mineral ingredients above mentioned for forming the compounds, and various forms of burners and burner attachments, give satisfactory results, but I do not limit myself to the proportions stated, as other proportions still give good results, and they can be varied without departing from my invention.

What I claim is—

A refractory compound containing strontia oxide, strontia carbonate, (native rock,) strontia sulphate, (native rock,) calcium oxide, calcium carbonate, magnesium oxide, magnesium carbonate, calcium fluoride, magnesium chloride, magnesium sulphate, uranium oxide, and starch, substantially as described.

In testimony whereof I affix my signature in presence of two witnesses.

JAMES L. HASTINGS.

Witnesses:
   THOMAS S. WILTBANK,
   JAMES W. WEST.